United States Patent
Xu et al.

(10) Patent No.: US 9,679,413 B2
(45) Date of Patent: Jun. 13, 2017

(54) SYSTEMS AND METHODS TO TRANSITION BETWEEN VIEWPOINTS IN A THREE-DIMENSIONAL ENVIRONMENT

(71) Applicant: Google Inc., Mountain View, CA (US)

(72) Inventors: Zhaoyang Xu, Mountain View, CA (US); Dominik Philemon Kaeser, Mountain View, CA (US); Joe Michael Kniss, Mountain View, CA (US)

(73) Assignee: Google Inc., Mountain View, CA (US)

( * ) Notice: Subject to any disclaimer, the term of this patent is extended or adjusted under 35 U.S.C. 154(b) by 104 days.

(21) Appl. No.: 14/825,384

(22) Filed: Aug. 13, 2015

(65) Prior Publication Data

US 2017/0046875 A1    Feb. 16, 2017

(51) Int. Cl.
| | |
|---|---|
| G06T 19/00 | (2011.01) |
| G06T 17/00 | (2006.01) |
| G06T 15/20 | (2011.01) |
| G06T 17/05 | (2011.01) |

(52) U.S. Cl.
CPC ............ *G06T 19/003* (2013.01); *G06T 15/20* (2013.01); *G06T 17/00* (2013.01); *G06T 17/05* (2013.01); *G06T 19/006* (2013.01); *G06T 2207/30241* (2013.01)

(58) Field of Classification Search
None
See application file for complete search history.

(56) References Cited

U.S. PATENT DOCUMENTS

| | | |
|---|---|---|
| 5,276,785 A | 1/1994 | Mackinlay et al. |
| 7,471,292 B2 | 12/2008 | Li |
| 7,933,395 B1 | 4/2011 | Bailly et al. |
| 8,302,007 B2 | 10/2012 | Barcay et al. |

(Continued)

FOREIGN PATENT DOCUMENTS

EP    2394716    12/2011

OTHER PUBLICATIONS

Virtual Earth Project, https://github.com/uic-evl/virtual-Earth-Project/blob/master/earth/simpleearth.py, retrieved on Jul. 21, 2015—3 pages.

(Continued)

*Primary Examiner* — Michelle Chin
(74) *Attorney, Agent, or Firm* — Dority & Manning, P.A.

(57) ABSTRACT

Systems and methods to transition between viewpoints in a three-dimensional environment are provided. One example method includes obtaining data indicative of an origin position and a destination position of a virtual camera. The method includes determining a distance between the origin position and the destination position of the virtual camera. The method includes determining a peak visible distance based at least in part on the distance between the origin position and the destination position of the virtual camera. The method includes identifying a peak position at which the viewpoint of the virtual camera corresponds to the peak visible distance. The method includes determining a parabolic camera trajectory that traverses the origin position, the peak position, and the destination position. The method includes transitioning the virtual camera from the origin position to the destination position along the parabolic camera trajectory. An example system includes a user computing device and a geographic information system.

20 Claims, 6 Drawing Sheets

(56) References Cited

U.S. PATENT DOCUMENTS

| | | |
|---|---|---|
| 8,350,849 B1 | 1/2013 | Jones et al. |
| 8,624,926 B2 | 1/2014 | Varadhan et al. |
| 8,650,220 B2 | 2/2014 | Rohlf et al. |
| 8,665,259 B2 | 3/2014 | McCrae et al. |
| 8,665,260 B2 | 3/2014 | McCrae et al. |
| 8,675,049 B2 | 3/2014 | Kopf et al. |
| 8,686,995 B2 | 4/2014 | Varadhan |
| 8,767,011 B1 | 7/2014 | Kornmann |
| 8,780,174 B1 | 7/2014 | Rawdon |
| 8,797,315 B1 | 8/2014 | Kuhne |
| 8,803,951 B2 | 8/2014 | Gay et al. |
| 8,847,992 B2 | 9/2014 | Kornmann et al. |
| 8,885,022 B2 | 11/2014 | Gay et al. |
| 8,933,925 B2 | 1/2015 | Sinha et al. |
| 8,948,788 B2 | 2/2015 | Conway et al. |
| 8,994,738 B1 | 3/2015 | Hernandez Esteban et al. |
| 9,019,279 B1 | 4/2015 | Prouty et al. |
| 9,025,860 B2 | 5/2015 | Zweig et al. |
| 9,070,210 B1 | 6/2015 | Overbeck |
| 2004/0085335 A1 | 5/2004 | Burlnyk et al. |
| 2009/0256840 A1 | 10/2009 | Varadhan et al. |
| 2009/0259976 A1 | 10/2009 | Varadhan et al. |
| 2010/0026712 A1 | 2/2010 | Aliprandi et al. |
| 2010/0045666 A1 | 2/2010 | Kornmann et al. |
| 2010/0045667 A1 | 2/2010 | Kornmann et al. |
| 2010/0045703 A1 | 2/2010 | Kornmann et al. |
| 2010/0053219 A1 | 3/2010 | Kornmann |
| 2010/0080466 A1 | 4/2010 | Chen et al. |
| 2010/0225644 A1 | 9/2010 | Swope, III et al. |
| 2010/0265248 A1 | 10/2010 | McCrae et al. |
| 2010/0268457 A1 | 10/2010 | McCrae et al. |
| 2011/0050496 A1* | 3/2011 | Wu .............. G01S 19/30 342/357.77 |
| 2011/0164030 A1 | 7/2011 | Gay et al. |
| 2012/0127170 A1 | 5/2012 | Varadhan |
| 2012/0331416 A1 | 12/2012 | Barcay et al. |
| 2013/0044139 A1 | 2/2013 | Hernandez Esteban |
| 2013/0293683 A1 | 11/2013 | Zhou et al. |
| 2013/0321399 A1 | 12/2013 | Rohlf |
| 2013/0321401 A1 | 12/2013 | Piemonte et al. |
| 2013/0321763 A1* | 12/2013 | Haddadi .............. G02C 13/005 351/204 |
| 2014/0118495 A1 | 5/2014 | Coombe |
| 2014/0240318 A1 | 8/2014 | Coombe et al. |
| 2014/0267236 A1 | 9/2014 | Kontkanen |
| 2014/0277680 A1* | 9/2014 | Youngquist ............ G05B 11/01 700/121 |
| 2015/0040073 A1 | 2/2015 | Barcay et al. |
| 2015/0170403 A1 | 6/2015 | Barcay |
| 2015/0178972 A1 | 6/2015 | Barcay et al. |

OTHER PUBLICATIONS

International Search Report & Written Opinion for PCT/US2016/042737 dated Sep. 27, 2016—9 pages.

* cited by examiner

SYSTEMS AND METHODS TO TRANSITION BETWEEN VIEWPOINTS IN A THREE-DIMENSIONAL ENVIRONMENT

FIELD

The present disclosure relates generally to systems and methods to transition between viewpoints in a three-dimensional environment and, more particularly, to systems and methods to determine a parabolic camera trajectory along which a virtual camera can be transitioned to provide an enhanced user understanding of the contextual or geographical relationship between an origin position and a destination position.

BACKGROUND

Certain computer applications can provide an interactive three-dimensional environment. For example, three-dimensional modeling software can be used to generate and modify three-dimensional models of real world objects.

Other applications that provide an interactive three-dimensional environment include a virtual globe application, a mapping application, or other components of a geographic information system. In particular, such applications can provide an interactive rendering of a three-dimensional model of all or a portion of the surface of the Earth. The three-dimensional model can include terrain, structures such as roads and buildings, or other points of interest.

In certain applications, the user can navigate about the three-dimensional environment. For example, the user can adjust the position and orientation of a virtual camera within the three-dimensional environment to control a viewpoint provided to such user. In particular, a viewpoint of the virtual camera can define the portion of the three-dimensional environment that is displayed to the user. Thus, only a relatively small portion of the three-dimensional environment is typically displayed to the user at a given time.

Further, certain applications may include a feature in which the virtual camera is automatically transitioned from an origin position to a destination position. As one example, such automatic transition can be performed upon entry of a search query by the user which requests to view a location that is a significant distance from the currently viewed location.

However, transition of the virtual camera along certain trajectories or in certain fashions may result in a visual experience that disorients or otherwise fails to provide a meaningful graphical transition for the user. As one example, if the virtual camera is panned at a significant velocity or for a significant distance prior to appropriate altitude change, the displayed portion of the model of the Earth may simply appear as an unrecognizable blur to the user. As another example, if the altitude of the camera is changed at a constant rate, the user will be given the perception that she is falling faster and faster as the virtual camera approaches the destination position.

These and other visual effects may undesirably disorient the user and detract from a user's understanding of the contextual or geographical relationship between the origin position and the destination position.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for transitioning between viewpoints in a three-dimensional environment. The method includes obtaining, by one or more computing devices, data indicative of an origin position and a destination position of a virtual camera in the three-dimensional environment. A viewpoint of the virtual camera defines a portion of the three-dimensional environment displayed to a user. A visible distance is associated with the viewpoint of the camera. The visible distance is correlated to a size of a visible area visible from the viewpoint. The method includes determining, by the one or more computing devices, a distance between the origin position and the destination position of the virtual camera. The method includes determining, by the one or more computing devices, a peak visible distance based at least in part on the distance between the origin position and the destination position of the virtual camera. The method includes identifying, by the one or more computing devices, a peak position at which the viewpoint of the virtual camera corresponds to the peak visible distance. The peak position includes a peak altitude. The method includes determining, by the one or more computing devices, a parabolic camera trajectory that traverses the origin position, the peak position, and the destination position. The method includes transitioning, by the one or more computing devices, the virtual camera from the origin position to the destination position along the parabolic camera trajectory.

Another example aspect of the present disclosure is directed to a computer system to transition between viewpoints in a three-dimensional environment. The system includes at least one processor and at least one non-transitory computer-readable medium storing instructions that, when executed by the at least one processor cause the computer system to perform operations. The instructions cause the computer system to obtain data indicative of an origin position and a destination position of a virtual camera in the three-dimensional environment. A viewpoint of the virtual camera defines a portion of the three-dimensional environment displayed to a user. The instructions cause the computer system to determine a distance between the origin position and the destination position of the virtual camera. The instructions cause the computer system to identify a parabolic camera trajectory based at least in part on the distance between the origin position and the destination position of the virtual camera. The parabolic camera trajectory includes a camera ascent portion and a camera descent portion. The instructions cause the computer system to transition the virtual camera from the origin position to the destination position along the parabolic camera trajectory. The instructions that cause the computer system to transition the virtual camera cause the computer system to: maintain the origin position in the viewpoint of the virtual camera for at least a majority of the camera ascent portion of the parabolic camera trajectory; and maintain the destination position in the viewpoint of the virtual camera for at least a majority of the camera descent portion of the parabolic camera trajectory.

Another example aspect of the present disclosure is directed to a computer system. The computer system includes a user computing device and a geographic information system server. At least one of the user computing device and the geographic information server include a non-transitory computer-readable medium storing instructions that, when executed by one or more processors cause the at least one of the user computing device and the geographic information server to obtain data indicative of an origin position and a destination position of a virtual camera in the three-dimensional environment. A viewpoint of the virtual camera defines a portion of the three-dimensional environment displayed to a user. A visible distance is associated with the viewpoint of the camera. The visible distance is correlated to a size of a visible area visible from the viewpoint. The instructions cause the at least one of the user computing device and the geographic information server to identify a parabolic camera trajectory that includes a camera ascent portion and a camera descent portion. The origin position is included in the viewpoint of the virtual camera for at least a majority of the camera ascent portion of the parabolic camera trajectory. The destination position is included in the viewpoint of the virtual camera for at least a majority of the camera descent portion of the parabolic camera trajectory. The instructions cause the at least one of the user computing device and the geographic information server to transition the virtual camera from the origin position to the destination position along the parabolic camera trajectory.

Other aspects of the present disclosure are directed to systems, apparatus, tangible, non-transitory computer-readable media, user interfaces, and devices to transition a virtual camera between positions.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1:
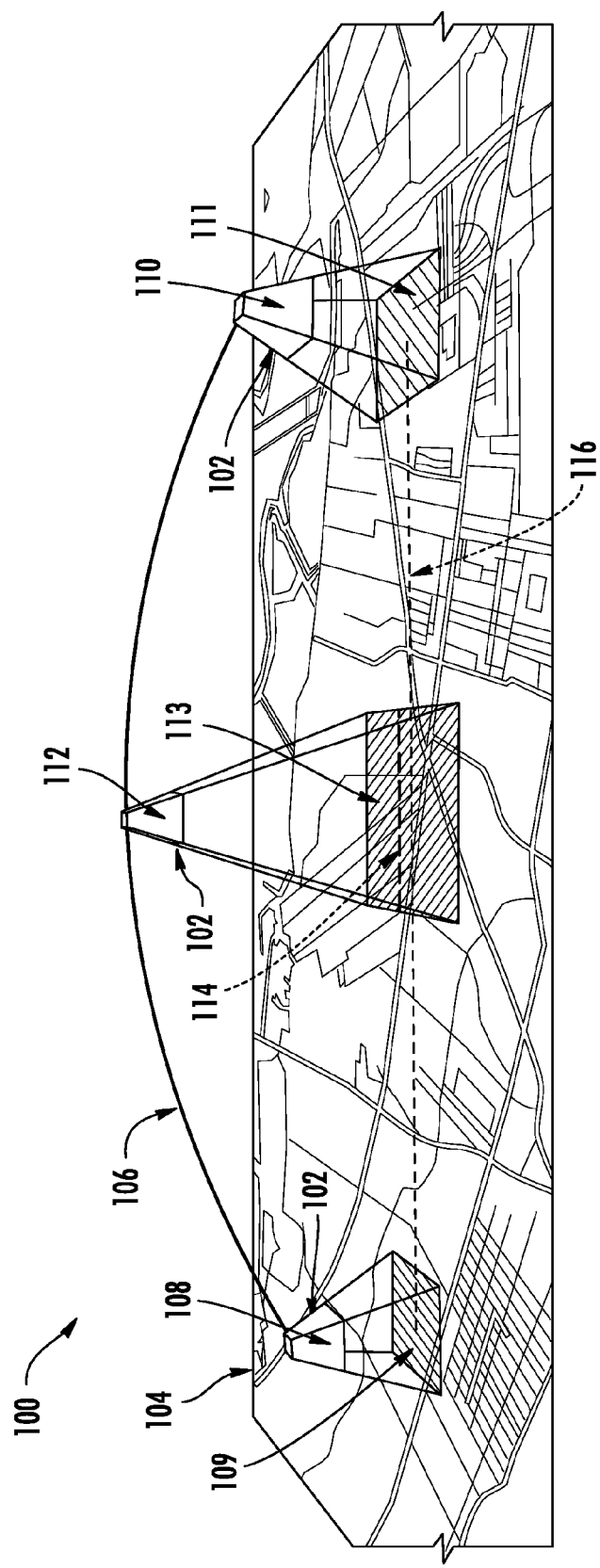
FIG. 1 depicts a simplified diagram of an example parabolic camera trajectory according to example embodiments of the present disclosure.

The present disclosure provides systems and methods to transition between viewpoints in a three-dimensional environment. In particular, the systems and methods of the present disclosure can determine a parabolic camera trajectory along which a virtual camera can be transitioned from an origin position to a destination position. The parabolic camera trajectory can have various characteristics that engender an enhanced user understanding of the contextual or geographical relationship between the origin position and the destination position.

More particularly, the systems and methods of the present disclosure can be implemented to assist in navigating about a three-dimensional environment. The three-dimensional environment can include a rendering of a three-dimensional model. As an example, the three-dimensional environment can be provided by a geographic information system, mapping application, virtual globe application, or web-browser and the three-dimensional model can model some or all of the surface of the Earth, including terrain, structures such as roads and buildings, or other points of interest.

A user can navigate about the three-dimensional environment to view renderings of the three-dimensional model from different perspectives or viewpoints. A virtual camera can be implemented to determine or be representative of a viewpoint provided or displayed to the user. In particular, the virtual camera can have a position and an orientation in three-dimensional space, where the position and orientation define a particular viewpoint of the three-dimensional space.

According to an aspect of the present disclosure, the systems and methods of the present disclosure can determine a parabolic camera trajectory along which a virtual camera can be transitioned from an origin position to a destination position. For example, the virtual camera may be currently located at a particular position which provides a viewpoint of a particular locale or portion of the surface of the Earth. If the user requests to view a different locale or portion of the surface of the Earth (e.g., enters a search string requesting such locale), the virtual camera can be transitioned from its current position (e.g., origin position) to a destination position that provides a viewpoint that includes such requested locale. In particular, the virtual camera can be transitioned along a parabolic camera trajectory that has various characteristics that enable an enhanced user understanding of the contextual or geographical relationship between the origin position and the destination position.

As one example, the parabolic camera trajectory can include a camera ascent portion and a camera descent portion. The parabolic camera trajectory can be selected or designed such that the origin position is included in the viewpoint of the virtual camera for at least a majority of the camera ascent portion of the parabolic camera trajectory and the destination position is included in the viewpoint of the virtual camera for at least a majority of the camera descent portion of the parabolic camera trajectory. In such fashion, the user can view the greater regional geographic areas around the origin and destination positions, enhancing user understanding of their respective geographical contexts.

As another example, the parabolic camera trajectory can be determined based on a distance between the origin position and the destination position. For example, a peak visible distance can be determined based at least in part on the distance between the origin position and the destination position. The peak visible distance can describe a desired size of a visible area when the virtual camera is located at a peak position of the parabolic camera trajectory. A peak position which provides such peak visible distance can be identified and a parabolic camera trajectory that passes through the origin position, the peak position, and the destination position can be determined.

In some implementations, the peak visible distance may be relatively close in scale to the distance between the origin position and the destination position (e.g., equal to the distance or equal to two-thirds of the distance). As such, at the peak position of the parabolic camera trajectory, both of the origin position and the destination position may be included (or almost included) in the viewpoint of the virtual camera and, therefore, displayed to the user (or almost displayed to the user) at the same time. In such fashion, the user can gain an enhanced understanding of the relative distance between the origin position and the destination position.

In some implementations, the systems and methods of the present disclosure input the distance between the origin position and the destination position into a scaling formula to obtain the peak visible distance. For example, the scaling formula can equal the distance between the origin position and the destination position multiplied by a scaling factor. In some implementations, the scaling factor is constant (e.g., equal to one or equal to two-thirds). In other implementations, the scaling factor changes as a function of the distance between the origin position and the destination position. For example, the scaling factor can be inversely proportional to the distance between the origin position and the destination position.

Additional aspects of the present disclosure relate to transitioning the virtual camera along the parabolic camera trajectory according to various velocity constraints. For example, a pan velocity of the virtual camera can be logarithmically proportional to an altitude of the virtual camera. Such logarithmic proportionality can result in the depicted terrain appearing to move across the user's screen at a constant velocity. Furthermore, relatively large pan velocities occur only at larger altitudes, preventing the disorienting and nauseating effect of the virtual camera skimming along the surface of the Earth prior to zooming away from the origin destination.

As another example, a zoom velocity of the virtual camera can be logarithmically proportional to the altitude of the virtual camera, thereby causing the displayed view to zoom at a fixed perceptual rate. For example, the virtual camera can ascend or descend at a rate of $\log_2$ Alt, such that objects in view repeatedly double in size over constant time intervals. Likewise, any pixel on the user's screen doubles its distance from the screen center in fixed time intervals. Such logarithmic treatment of zoom velocity can counteract the perception that the user is falling faster and faster as they approach the surface of the Earth.

Yet further aspects of the present disclosure relate to determining a parabolic tilt trajectory that describes a tilt angle of the virtual camera during the parabolic camera trajectory. In particular, the parabolic tilt trajectory can traverse an origin tilt angle at which the virtual camera is tilted at the origin position, a trough tilt angle at which the virtual camera will be tilted at the peak position, and a destination tilt angle at which the virtual camera will be tilted at the destination position.

In some implementations, the trough tilt angle is determined by identifying an angle at which, when the virtual camera is at the peak position and in such angle, the viewpoint of the virtual camera would include at least a portion of both an origin visible area associated with the origin position and a destination visible area associated with the destination position if the peak visible distance were equal to the distance between the origin position and the destination position.

As another example, the systems of the present disclosure can iteratively recalculate the parabolic camera trajectory and the parabolic tilt trajectory. For example, at each iteration, one or both of the peak position and the trough tilt angle can be adjusted and the trajectories can be recalculated. Iterative recalculations can be performed until the trajectories satisfy all desired constraints.

Thus, the systems and methods of the present disclosure provide techniques to transition a virtual camera between viewpoints along a parabolic camera trajectory in a fashion that provides the user with an enhanced understanding of the geographical context of the origin and destination positions.

With reference now to the Figures, example embodiments of the present disclosure will be discussed in further detail.

Example Three-Dimensional Environment and Virtual Camera

FIG. 1 depicts a simplified diagram 100 of an example parabolic camera trajectory 106 according to example embodiments of the present disclosure. In particular, diagram 100 illustrates a virtual camera 102 being transitioned along the parabolic camera trajectory 106. The trajectory 106 traverses an origin position 108, a peak position 112, and a destination position 110 within a three-dimensional environment. The origin position 108 and the destination position 110 may have the same or different altitudes.

More generally, the virtual camera 102 can be moved about within a three-dimensional environment. As will be discussed further with respect to FIG. 2, the virtual camera 102 can have a position and orientation in three-dimensional space. The position and orientation of the virtual camera 102 can define a viewpoint of the virtual camera 102. Likewise, the viewpoint of the virtual camera 102 can define which portion of the three-dimensional environment is displayed to a user.

In some implementations, as illustrated in FIG. 1, the three-dimensional environment includes a Mercator representation 104 of the surface of the Earth. In other implementations, the three-dimensional environment includes a spherical representation of the surface of the Earth (e.g., a virtual globe).

Aspects of the present disclosure are directed to determining the parabolic camera trajectory 106. In particular, in some implementations, the parabolic camera trajectory 106 can be determined based at least in part on a distance between the origin position 108 and the destination position 110. In some implementations, the distance between the origin position 108 and the destination position 110 equals a straight line distance between the three-dimensional coordinates of the positions 108 and 110.

In other implementations, the distance between the origin position 108 and the destination position 110 equals a ground-based distance 116 between an origin visible area 109 and a destination visible area 111. For example, the ground-based distance 116 can equal the physical distance (e.g., taking into account curvature of the Earth) between a pair of locations on the surface of the Earth that respectively correspond to respective centers of the visible areas 109 and 111. As another example, the ground-based distance 116 can equal a distance between Mercator representations of the pair of locations on the surface of the Earth that respectively correspond to respective centers of the visible areas 109 and 111.

More particularly, the viewpoint of the virtual camera 102 can define or correspond to a visible area that is visible from such viewpoint. As an example, as illustrated in FIG. 1, when the virtual camera 102 is located in the origin position 108, the viewpoint of the virtual camera 102 corresponds to origin visible area 109. Likewise, when the virtual camera 102 is located in the peak position 112, the viewpoint of the camera 102 corresponds to peak visible area 113; and when the virtual camera 102 is located in the destination position 110, the viewpoint of the camera 102 corresponds to destination visible area 111.

The viewpoint of the virtual camera 102 can have a visible distance. The visible distance can describe or be correlated to the size of the current visible area of the current viewpoint of the virtual camera 102. As an example, the visible distance for a given viewpoint can correspond or be correlated to a width, a length, an area, a diagonal, or other aspects of the size of the visible area for such viewpoint. As one example, as illustrated in FIG. 1, a peak visible distance of the peak visible area 113 can be the width 114 of the peak visible area 113.

As noted, in some implementations, the parabolic camera trajectory 106 is determined based on the distance between the origin position 108 and the destination position 110. In particular, in some implementations, the trajectory 106 is selected or designed such that it traverses a peak position 112 at which the viewpoint of the virtual camera 102 corresponds to a desired peak visible distance.

As one non-limiting example, the peak position 112 may be chosen such that the peak visible distance equals the distance between the origin position 108 and the destination position 110 multiplied by some scaling factor, where the peak visible distance corresponds to the width 114 of the peak visible area 113, and where the distance between the positions 108 and 110 corresponds to a ground-based distance 116 between respective centers of the origin visible area 109 and the destination visible area 111.

Figure 2:
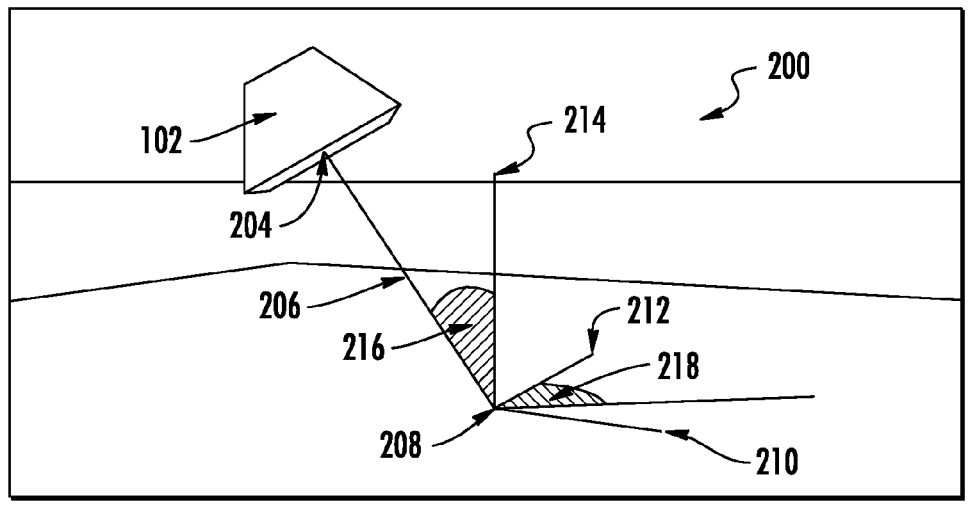
FIG. 2 depicts a simplified diagram of an example virtual camera according to example embodiments of the present disclosure.

FIG. 2 depicts a simplified diagram 200 of an example virtual camera 102 according to example embodiments of the present disclosure. Virtual camera 102 has a position 204 in three-dimensional space. In some implementations, the position 204 can be expressed as a latitude, a longitude, and an altitude. The latitude and the longitude can correspond to a location on a Mercator representation of the Earth or a location on a spherical virtual globe representation of the Earth. In other implementations, the position 204 can be expressed in Cartesian coordinates, spherical coordinates, or other coordinate systems.

The virtual camera 102 can also have an orientation that provides a line of sight 206. The line of sight 206 intersects with the three-dimensional model at a target location 208. An x-axis 210, a y-axis 212, and a z-axis 214 can be defined relative to the target location 208.

A tilt angle 216 can describe a deviation of the line of sight 206 from the z-axis 214. Thus, when the tilt a tilt angle 216 equals zero, the virtual camera 102 will have a top-down perspective (e.g., the line of sight 206 will correspond to the z-axis 214).

A bearing 218 of the virtual camera 102 can describe a deviation of a negative of a projection of the line of sight 206 onto an x-y plane defined by the x-axis 210 and the y-axis 212. Thus, the orientation of the virtual camera 102 can be described in terms of the tilt angle 216 and the bearing 218.

Example Methods to Transition a Virtual Camera

Figure 3:
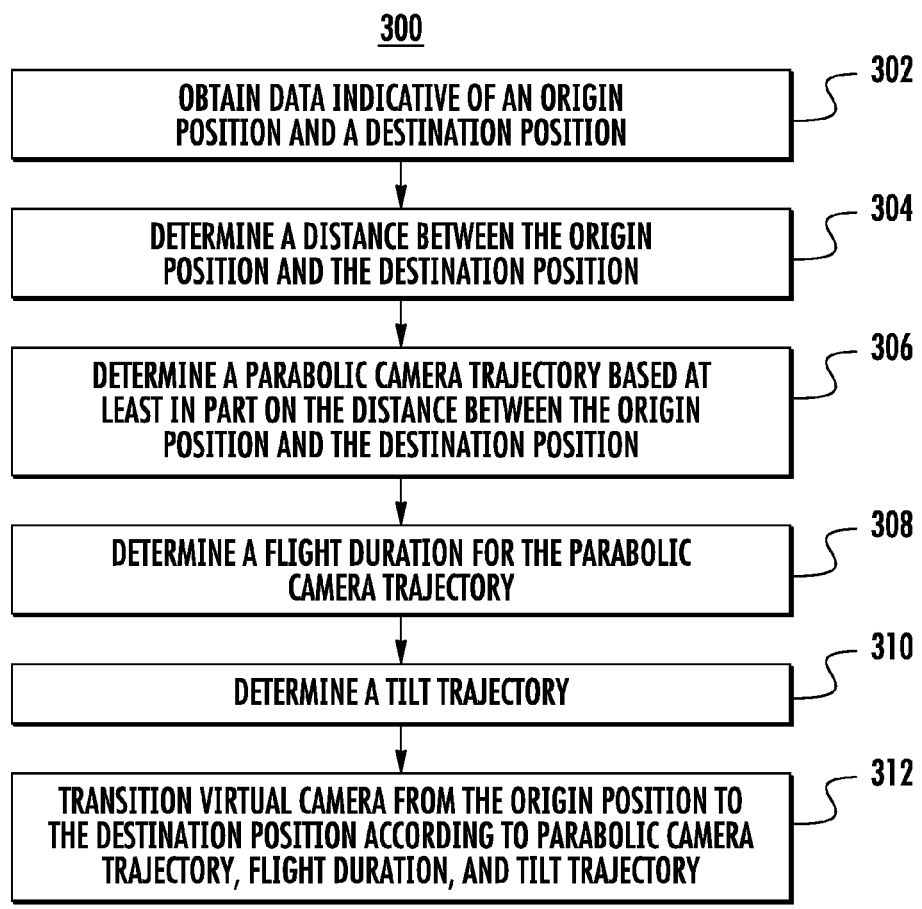
FIG. 3 depicts an example method to manipulate a virtual camera in a three-dimensional environment according to example embodiments of the present disclosure.

FIG. 3 depicts an example method to manipulate a virtual camera in a three-dimensional environment according to example embodiments of the present disclosure.

At 302, data is obtained that is indicative of an origin position and a destination position of the virtual camera in the three-dimensional environment. For example, the virtual camera may be currently located at a particular position which provides a viewpoint of a particular locale or portion of the surface of the Earth. If the user requests to view a different locale or portion of the surface of the Earth (e.g., enters a search string requesting such locale), the virtual camera can be transitioned from its current position (e.g., origin position) to a destination position that provides a viewpoint that includes such requested locale. In particular, the virtual camera can be transitioned along a parabolic camera trajectory that has various characteristics that enable an enhanced user understanding of the contextual or geographical relationship between the origin position and the destination position.

At 304, a distance between the origin position and the destination position is determined. In some implementations, the distance between the origin position and the destination position equals a straight line distance between the three-dimensional coordinates of the positions. In other implementations, the distance between the origin position and the destination position equals a ground-based distance between an origin visible area and a destination visible area. For example, the ground-based distance can equal the physical distance (e.g., taking into account curvature of the Earth) between a pair of locations on the surface of the Earth that respectively correspond to respective centers of the visible areas and. As another example, the ground-based distance can equal a distance between Mercator representations of the pair of locations on the surface of the Earth that respectively correspond to respective centers of the visible areas and.

At 306, a parabolic camera trajectory is determined based at least in part on the distance between the origin position and the destination position. As one example, the parabolic camera trajectory can include a camera ascent portion and a camera descent portion. The parabolic camera trajectory can be selected or designed such that the origin position is included in the viewpoint of the virtual camera for at least a majority of the camera ascent portion of the parabolic camera trajectory and the destination position is included in the viewpoint of the virtual camera for at least a majority of the camera descent portion of the parabolic camera trajectory. In such fashion, the user can view the greater regional geographic areas around the origin and destination positions, enhancing user understanding of their respective geographical contexts. In further examples, the parabolic camera trajectory can be selected or designed such that the origin position is included in the viewpoint of the virtual camera for at least two-thirds, three-quarters, or other portions of the camera ascent portion of the parabolic camera trajectory and such that the destination position is included in the viewpoint of the virtual camera for at least two-thirds, three-quarters, or other portions of the camera descent portion of the parabolic camera trajectory.

Figure 4:
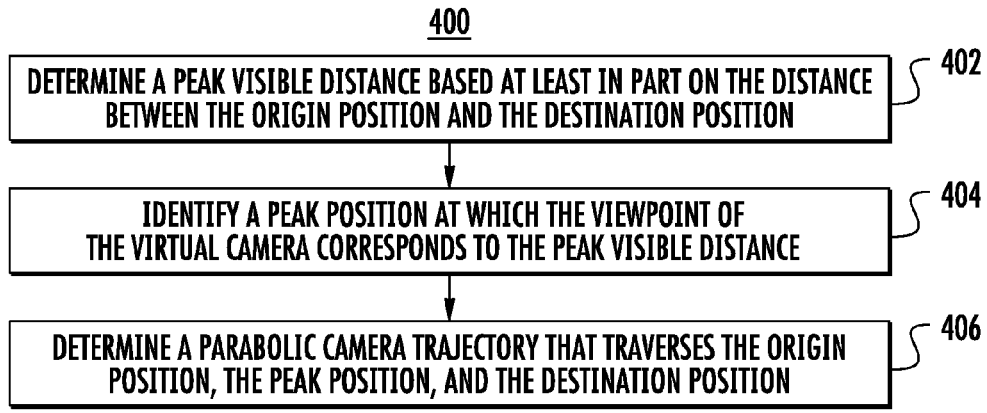
FIG. 4 depicts an example method to determine a parabolic camera trajectory according to example embodiments of the present disclosure.

As another example, FIG. 4 depicts an example method 400 to determine a parabolic camera trajectory according to example embodiments of the present disclosure.

At 402, a peak visible distance is determined based at least in part on the distance between the origin position and the destination position. The peak visible distance can describe or be correlated to a desired size of a visible area when the virtual camera is located at a peak position of the parabolic camera trajectory. A peak position which corresponds to such peak visible distance can be identified and a parabolic camera trajectory that passes through the origin position, the peak position, and the destination position can be determined.

In some implementations, the peak visible distance may be relatively close in scale to the distance between the origin position and the destination position (e.g., equal to the distance or equal to two-thirds of the distance). As such, at the peak position of the parabolic camera trajectory, both of the origin position and the destination position may be included (or almost included) in the viewpoint of the virtual camera and, therefore, displayed to the user (or almost displayed to the user) at the same time. In such fashion, the user can gain an enhanced understanding of the relative distance between the origin position and the destination position.

In some implementations, the systems and methods of the present disclosure input the distance between the origin position and the destination position into a scaling formula to obtain the peak visible distance. For example, the scaling formula can equal the distance between the origin position and the destination position multiplied by a scaling factor. In some implementations, the scaling factor is constant (e.g., less than or equal to one but greater than or equal to two-thirds). Any scaling factor value can be used. In other implementations, the scaling factor changes as a function of the distance between the origin position and the destination position. For example, the scaling factor can be inversely proportional to the distance between the origin position and the destination position.

At 404, a peak position at which the viewpoint of the virtual camera corresponds to the peak visible distance is identified. As one example, the peak position can include a peak altitude at which the viewpoint of the virtual camera corresponds to the peak visible distance when the tilt angle equals zero.

At 406, a parabolic camera trajectory that traverses the origin position, the peak position, and the destination position is determined. For example, given the three positions in three-dimensional space, there may only be one closed form parabolic solution that traverses all three positions.

In some implementations, the parabolic camera trajectory can be expressed in two-dimensions. More particularly, the parabola can be expressed according to an x-dimension that corresponds to a line between the origin position and the destination position (or corresponds to a projection of such line onto the surface plane of the three-dimensional model). The parabola can be further expressed in a y-dimension that corresponds to an altitude of the virtual camera. In one example, the origin destination corresponds to an x-dimension value of zero and the destination position corresponds to an x-dimension value of one.

In some implementations, the y-dimension of the parabola (or other dimension that corresponds to an altitude of the virtual camera) is expressed as a logarithm of the virtual camera altitude. Stated differently, the parabola camera trajectory is a parabola when the altitude of the camera is treated logarithmically.

Figure 5:
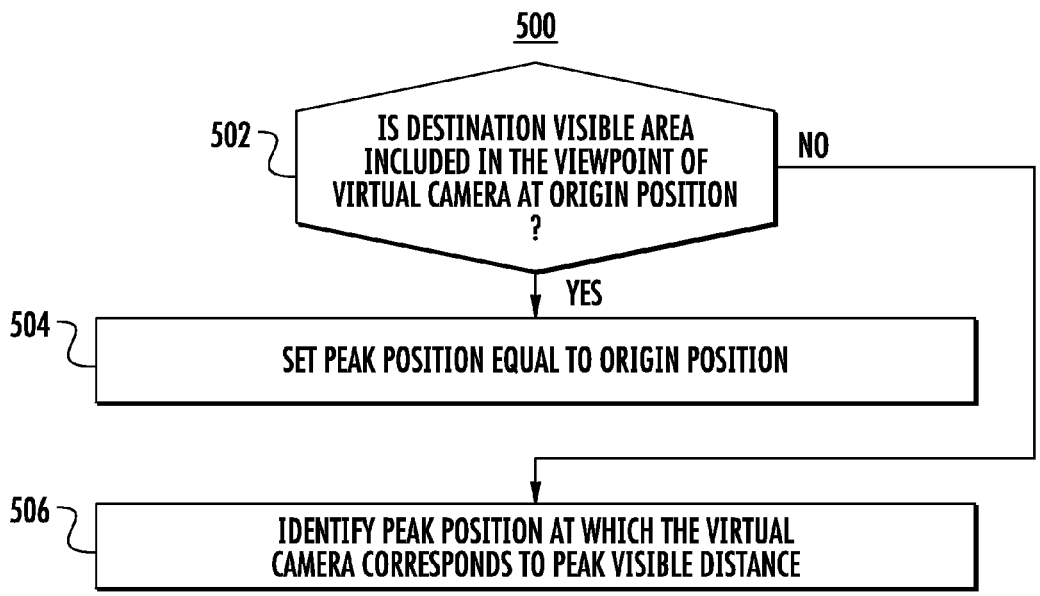
FIG. 5 depicts an example method to determine a parabolic camera trajectory according to example embodiments of the present disclosure.

FIG. 5 depicts another example method to determine a parabolic camera trajectory according to example embodiments of the present disclosure.

At 502, it is determined whether a destination visible area is included in the viewpoint of the virtual camera when the virtual camera is at the origin position. As one example, with reference to FIG. 1, it can be determined whether all or a portion (e.g., the center) of the destination visible area 111 in included within the origin visible area 109.

Referring again to FIG. 5, if it is determined at 502 that the destination visible area is included in the viewpoint of the virtual camera when the virtual camera is at the origin position, then method 500 proceeds to 504. At 504, the peak position is set equal to origin position. In such fashion, the parabolic camera trajectory does not cause the virtual camera to unnecessarily gain altitude prior to returning to a relatively nearby position.

However, if it is determined at 502 that the destination visible area is not included in the viewpoint of the virtual camera when the virtual camera is at the origin position, then method 500 proceeds to 506. At 506, a peak position is identified at which the virtual camera corresponds to a peak visible distance. More particularly, the peak position can be determined as described in method 400 of FIG. 4 or according to other techniques.

Figure 6:
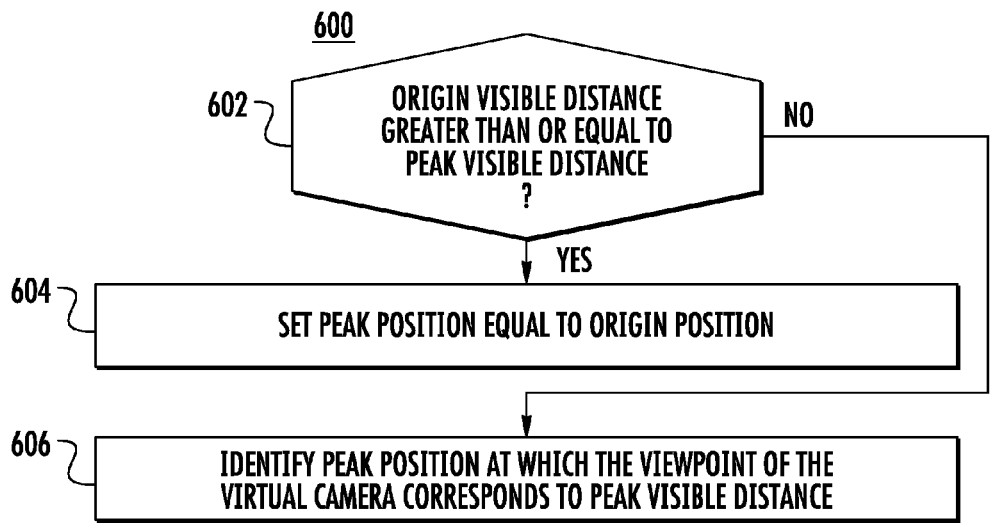
FIG. 6 depicts an example method to determine a parabolic camera trajectory according to example embodiments of the present disclosure.

FIG. 6 depicts yet another example method to determine a parabolic camera trajectory according to example embodiments of the present disclosure.

At 602, it is determined whether an origin visible distance is greater than or equal to a peak visible distance. As one example, with reference to FIG. 1, it can be determined whether the visible distance associated with origin visible area 109 is greater than or equal to the peak visible distance associated with peak visible area 113 (e.g., width 114).

Referring again to FIG. 6, if it is determined at 602 that the origin visible distance is greater than or equal to the peak visible distance, then method 600 proceeds to 604. At 604, the peak position is set equal to the origin position. In such fashion, the parabolic camera trajectory does not cause the virtual camera to unnecessarily gain altitude prior to returning to a relatively nearby position.

However, if it is determined at 602 that the origin visible distance is not greater than or equal to the peak visible distance, then method 600 proceeds to 606. At 606, the peak position at which the viewpoint of the virtual camera corresponds to the peak visible distance is identified. More particularly, the peak position can be determined as described in method 400 of FIG. 4 or according to other techniques.

Referring again to FIG. 3, after the parabolic camera trajectory is determined at 306, then at 308, a flight duration is determined for the parabolic camera trajectory. For example, the flight duration may always equal some fixed length. As another example, the flight duration may be a function of scaled constants of distance between the origin position and the destination position, the peak altitude, a relative altitude difference between the origin position and the destination position, and/or other parameters of the trajectory.

Figure 7:
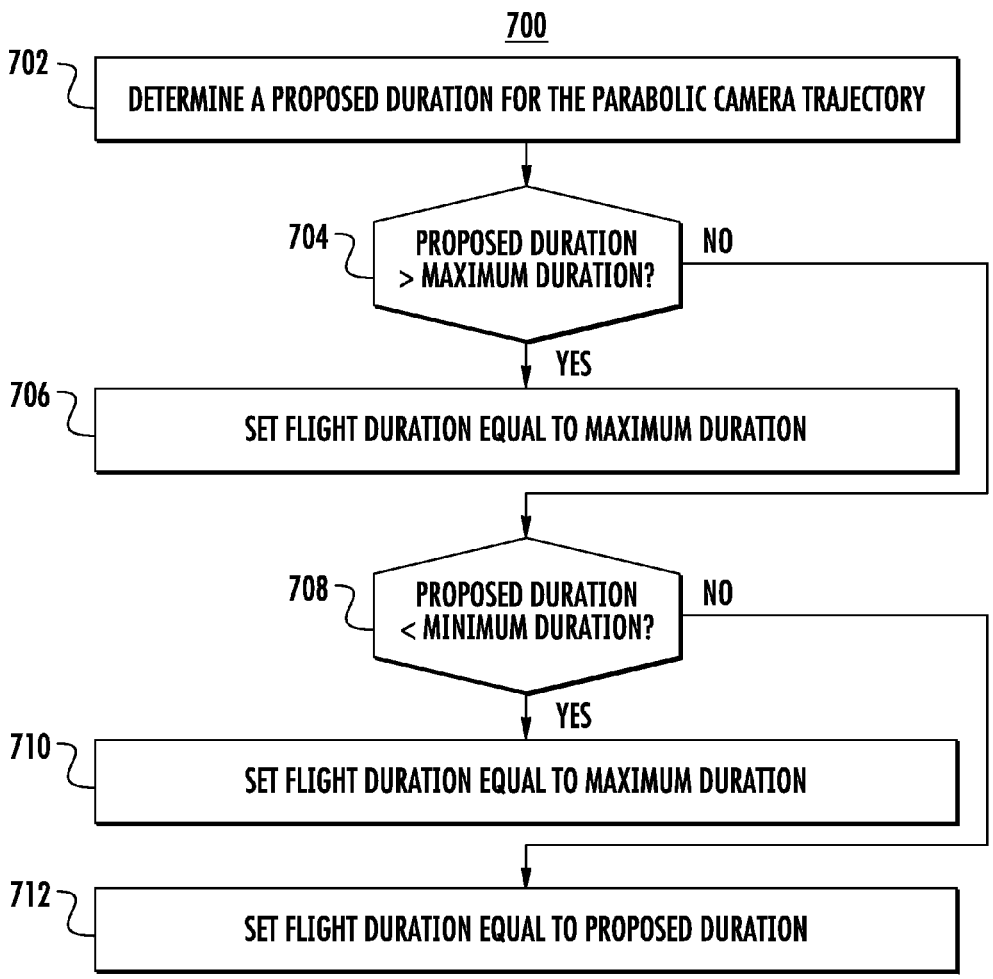
FIG. 7 depicts an example method to determine a duration of a parabolic camera trajectory according to example embodiments of the present disclosure.

As one example, FIG. 7 depicts an example method to determine a duration of a parabolic camera trajectory according to example embodiments of the present disclosure.

At 702, a proposed duration is determined for the parabolic camera trajectory. At 704, it is determined whether the proposed duration is greater than a maximum duration. As one non-limiting example, the maximum duration may be 3 or 5 seconds.

If it is determined at 704 that the proposed duration is greater than the maximum duration, then method 700 proceeds to 706 and sets the flight duration equal to the maximum duration.

However, if it is determined at 704 that the proposed duration is not greater than the maximum duration, the method 700 proceeds to 708. At 708, it is determined whether the proposed duration is less than a minimum duration. As one non-limiting example, the minimum duration may be 0.3 seconds.

If it is determined at 708 that the proposed duration is less than the minimum duration, then method 700 proceeds to 710 and sets the flight duration equal to the minimum duration.

However, if it is determined at 708 that the proposed duration is not less than the maximum duration, the method 700 proceeds to 712 and sets the flight duration equal to the proposed duration.

Referring again to FIG. 3, after the flight duration is determined at 308, then at 310, a tilt trajectory is determined.

Figure 8:
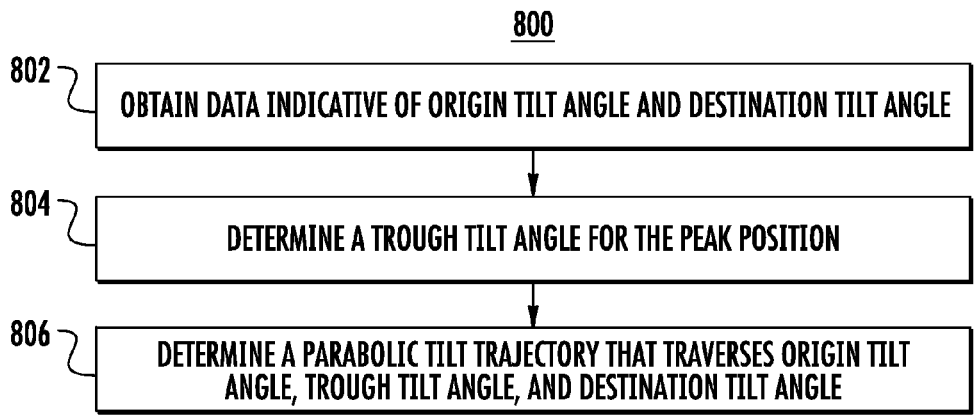
FIG. 8 depicts an example method to determine a parabolic tilt trajectory according to example embodiments of the present disclosure.

As one example, FIG. 8 depicts an example method to determine a parabolic tilt trajectory according to example embodiments of the present disclosure.

At 802, data indicative of an origin tilt angle and a destination tilt angle is obtained. In particular, the parabolic tilt trajectory can traverse an origin tilt angle at which the virtual camera is tilted at the origin position, a trough tilt angle at which the virtual camera will be tilted at the peak position, and a destination tilt angle at which the virtual camera will be tilted at the destination position. In one example, the origin tilt angle equals the current tilt angle of the virtual camera when the transition is prompted. In another example, the destination tilt angle is set equal to the origin tilt angle. In another example, the destination tilt angle is determined based on the destination position. For example, the destination tilt angle can be specific to the locale depicted at the destination position (e.g., the locale which the user has been requested through, for example, entry of a search string).

At 804, the trough tilt angle is determined for the peak position. In some implementations, the trough tilt angle is determined by identifying an angle at which, when the virtual camera is at the peak position and in such angle, the viewpoint of the virtual camera would include at least a portion of both an origin visible area associated with the origin position and a destination visible area associated with the destination position if the peak visible distance were equal to the distance between the origin position and the destination position. In other implementations, the trough tilt angle is always set to zero or can be set to some scaled version of the origin tilt angle.

At 806, a parabolic tilt trajectory that traverses the origin tilt angle, the trough tilt angle, and the destination tilt angle is determined.

Figure 9:
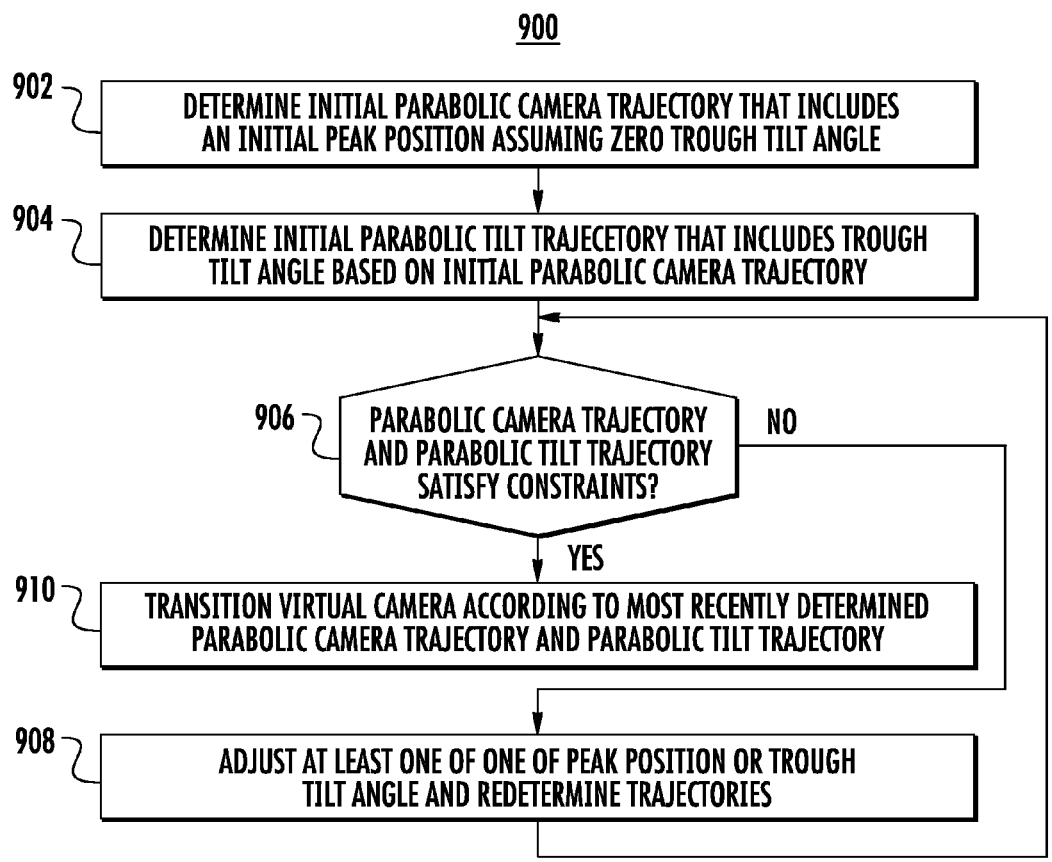
FIG. 9 depicts an example method to determine a parabolic camera trajectory and a parabolic tilt trajectory according to example embodiments of the present disclosure.

In some implementations, the systems of the present disclosure can iteratively recalculate the parabolic camera trajectory and the parabolic tilt trajectory. As one example, FIG. 9 depicts an example method to determine a parabolic camera trajectory and a parabolic tilt trajectory according to example embodiments of the present disclosure.

At 902, an initial parabolic camera trajectory that includes an initial peak position is determined assuming a trough tilt angle of zero. At 904, an initial parabolic tilt trajectory that includes a trough tilt angle is determined based on the initial parabolic camera trajectory.

At 906, it is determined whether the parabolic camera trajectory and the parabolic tilt trajectory satisfy one or more constraints. If it is determined at 906 that the parabolic camera trajectory and the parabolic tilt trajectory do not satisfy the one or more constraints, then method 900 proceeds to 908. At 908, at least one of the peak position or the trough tilt angle are adjusted and the parabolic camera trajectory and the parabolic tilt trajectory are re-determined.

After 908, method 900 returns to 906 and determines whether the trajectories satisfy the one or more constraints. In such fashion, at each of a plurality of iterations, one or both of the peak position and the trough tilt angle can be adjusted and the trajectories can be recalculated. Iterative recalculations can be performed until the trajectories satisfy all desired constraints.

Referring again to 906, if it is determined that the parabolic camera trajectory and the parabolic tilt trajectory do satisfy the one or more constraints, then method 900 proceeds to 910. At 910, the virtual camera is transitioned according to the most recently determined parabolic camera trajectory and parabolic tilt trajectory.

Referring again to FIG. 3, after the tilt trajectory is determined at 310, then at 312, the virtual camera is transitioned from the origin position to the destination position according to the parabolic camera trajectory, the flight duration, and the tilt trajectory.

In some implementations, at 312, the virtual camera can be transitioned along the parabolic camera trajectory according to various velocity constraints. For example, a pan velocity of the virtual camera can be logarithmically proportional to an altitude of the virtual camera. Such logarithmic proportionality can result in the depicted terrain appearing to move across the user's screen at a constant velocity. Furthermore, relatively large pan velocities occur only at larger altitudes, preventing the disorienting and nauseating effect of the virtual camera skimming along the surface of the Earth prior to zooming away from the origin destination.

As another example, a zoom velocity of the virtual camera can be logarithmically proportional to the altitude of the virtual camera, thereby causing the displayed view to zoom at a fixed perceptual rate. For example, the virtual camera can ascend or descend at a rate of $\log_2$ Alt, such that objects in view repeatedly double in size over constant time intervals. Likewise, any pixel on the user's screen doubles its distance from the screen center in fixed time intervals. Such logarithmic treatment of zoom velocity can counteract the perception that the user is falling faster and faster as they approach the surface of the Earth.

Further, by transitioning the camera according to the parabolic tilt trajectory, the virtual camera is gradually untilted until it reaches the peak of the parabola. The virtual camera is then re-tilted as it approaches the destination position. Such tilt manipulation can lead, for example, to a swoop-out to top-down, then swoop-in to tilted view visual effect.

In particular, as discussed above with respect to FIG. 2, a tilt angle of zero corresponds to a top-down perspective. Therefore, when the tilt angle of the virtual camera is decreased toward the trough tilt angle as the virtual camera ascends toward the peak position, the virtual camera will be tilted closer to the top-down perspective (but not necessarily reaching such perspective). Likewise, when the tilt angle of the virtual camera is increased away from the trough tilt angle as the virtual camera descends away from the peak position, the virtual camera will be tilted farther away from the top-down perspective.

Example System to Transition a Virtual Camera

Figure 10:
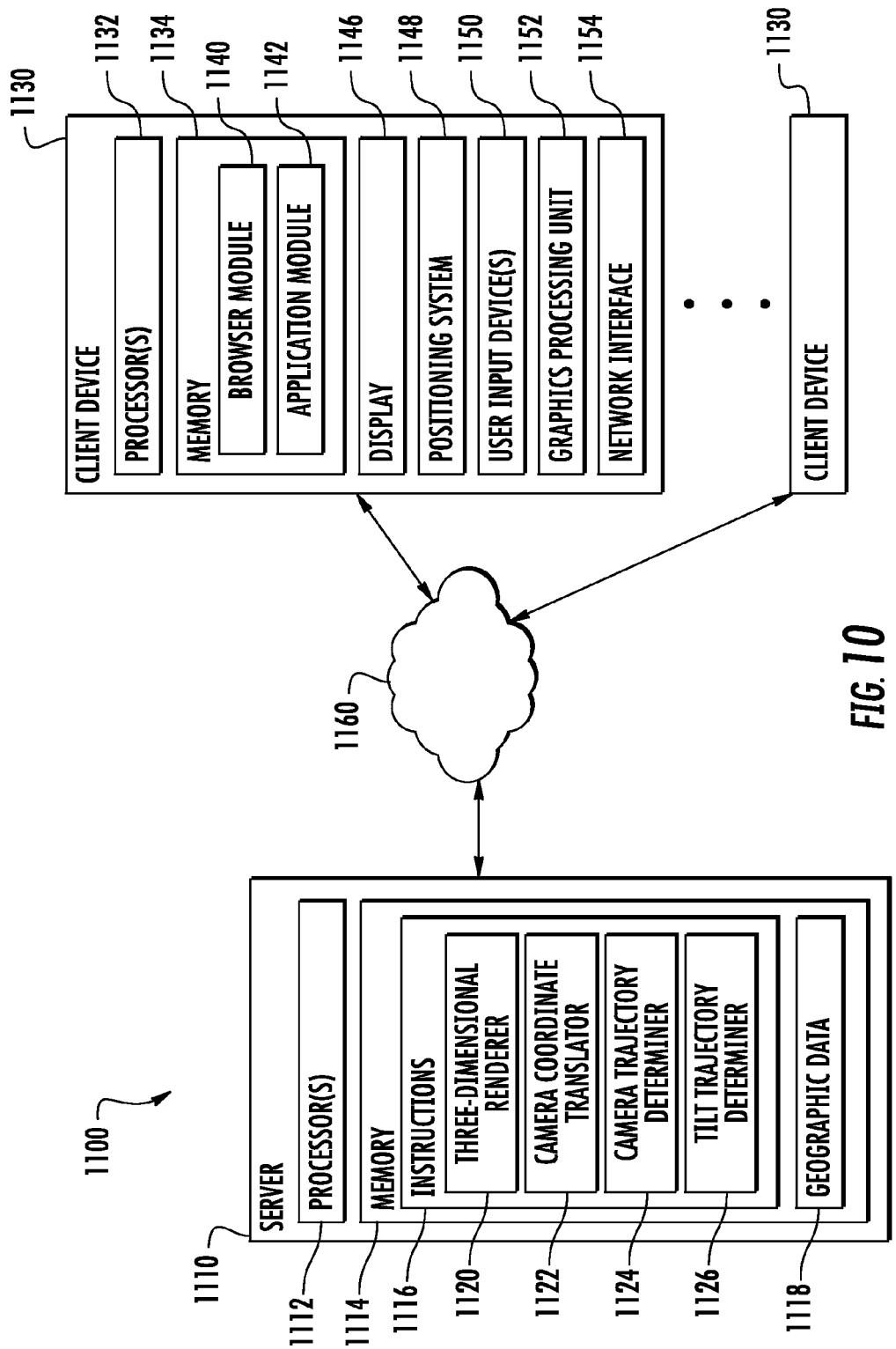
FIG. 10 depicts an example system to manipulate a virtual camera in a three-dimensional environment according to example embodiments of the present disclosure.

FIG. 10 depicts an example system 1100 to manipulate a virtual camera in a three-dimensional environment according to example embodiments of the present disclosure. The system 1100 has a client-server architecture that includes a server 1110 that communicates with one or more client devices 1130 over a network 1160. However, the present disclosure can be implemented using other suitable architectures, such as a single computing device unconnected to a network.

The system 1100 includes a server 1110, such as, for example, a web server. The server 1110 can be one or more computing devices that are implemented as a parallel or distributed computing system. In particular, multiple computing devices can act together as a single server 1110. The server 1110 can have one or more processor(s) 1112 and a memory 1114. The server 1110 can also include a network interface used to communicate with one or more remote computing devices (e.g., client devices) 1130 over a network 1160.

The processor(s) 1112 can be any suitable processing device, such as a microprocessor, microcontroller, integrated circuit, or other suitable processing device. The memory 1114 can include any suitable computing system or media, including, but not limited to, non-transitory computer-readable media, RAM, ROM, hard drives, flash drives, or other memory devices. The memory 1114 can store information accessible by processor(s) 1112, including instructions 1116 that can be executed by processor(s) 1112. The instructions 1116 can be any set of instructions that when executed by the processor(s) 1112, cause the processor(s) 1112 to provide desired functionality.

In particular, the instructions 1116 can be executed by the processor(s) 1112 to implement a three-dimensional renderer 1120, a camera coordinate translator 1122, a camera trajectory determiner 1124, and a tilt trajectory determiner 1126.

The three-dimensional rendering module 1120 can be implanted to render a three-dimensional model in a three-dimensional environment according to any known rendering techniques or technology.

The camera coordinate translator 1122 can be implemented to translate virtual camera coordinates or positions and/or orientations (e.g., a set of coordinates traversed by a particular trajectory) between various coordinate systems. For example, the camera coordinate translator 1122 can be implemented to translate a given coordinate expressed as a latitude, longitude, and altitude into a position within three-dimensional space expressed in spherical coordinates or other coordinate systems and vice versa.

The camera trajectory determiner 1124 can be implemented to determine a parabolic camera trajectory for a virtual camera. For example, the camera trajectory determiner 1124 can be implemented to perform some or all of methods 300, 400, 500, 600, and 700.

The tilt trajectory determiner 1126 can be implemented to determine a tilt trajectory for a virtual camera. For example, the tilt trajectory determiner can be implemented to perform some or all of methods 800 and 900.

Each of the three-dimensional renderer 1120, the camera coordinate translator 1122, the camera trajectory determiner 1124, and the tilt trajectory determiner 1126 include computer logic utilized to provide desired functionality. Thus, each of the three-dimensional renderer 1120, the camera coordinate translator 1122, the camera trajectory determiner 1124, and the tilt trajectory determiner 1126 can be implemented in hardware, application specific circuits, firmware and/or software controlling a general purpose processor. In one embodiment, each of the three-dimensional renderer 1120, the camera coordinate translator 1122, the camera trajectory determiner 1124, and the tilt trajectory determiner 1126 are program code files stored on the storage device, loaded into memory and executed by a processor or can be provided from computer program products, for example computer executable instructions, that are stored in a tangible computer-readable storage medium such as RAM, hard disk or optical or magnetic media. The three-dimensional renderer 1120, the camera coordinate translator 1122, the camera trajectory determiner 1124, and the tilt trajectory determiner 1126 can each correspond to one or more different programs, files, circuits, or sets of instructions. Likewise, two or more the three-dimensional renderer 1120, the camera coordinate translator 1122, the camera trajectory determiner 1124, and the tilt trajectory determiner 1126 are combined into a single program, file, circuit, or set of instructions.

Although the three-dimensional renderer 1120, the camera coordinate translator 1122, the camera trajectory determiner 1124, and the tilt trajectory determiner 1126 are illustrated in FIG. 10 as being included in the server 1110, in other implementations, one or more (e.g., all) of the three-dimensional renderer 1120, the camera coordinate translator 1122, the camera trajectory determiner 1124, and the tilt trajectory determiner 1126 are included in each client device 1130. For example, in some implementations, the methods of the present disclosure are implemented wholly at the client device 1130 or may be performed at the client device 1130 based on data received from the server 1110.

Memory 1114 can also include geographic data 1118 that can be retrieved, manipulated, created, or stored by processor(s) 1112. Geographic data 1118 can include geographic imagery (e.g., digital maps, satellite images, aerial photographs, street-level photographs, synthetic models, etc.), tables, vector data (e.g., vector representations of roads, parcels, buildings, etc.), point of interest data (e.g., locales such as islands, cities, restaurants, hospitals, parks, hotels, and schools), or other suitable geospatial data or related information. As an example, geographic data 1118 can be used to generate a rendering of a three-dimensional model of the surface of the Earth.

The geographic data 1118 can be stored in one or more databases. The one or more databases can be connected to the server 1110 by a high bandwidth LAN or WAN, or can also be connected to server 1110 through network 1160. The one or more databases can be split up so that they are located in multiple locales.

The server 1110 can exchange data with one or more client devices 1130 over the network 1160. Although two clients 1130 are illustrated in FIG. 10, any number of client devices 1130 can be connected to the server 1110 over the network 1160. The client devices 1130 can be any suitable type of computing device, such as a general purpose computer, special purpose computer, navigational device, laptop, desktop, integrated circuit, mobile device, smartphone, tablet, wearable-computing devices, a display with one or more processors coupled thereto and/or embedded therein, or other suitable computing device. Further, client device 1130 can be multiple computing devices acting together to perform operations or computing actions.

Similar to server 1110, a client device 1130 can include a processor(s) 1132 and a memory 1134. The memory 1134 can store information accessible by processor(s) 1132, including instructions that can be executed by processor(s) and data. As an example, memory 1134 can store a browser module 1140 and an application module 1142.

Browser module 1140 can provide instructions for implementing a browser. In particular, the user of client device 1130 can exchange data with server 1110 by using the browser to visit a website accessible at a particular web-address. The tilt and pan navigation of the present disclosure can be provided as an element of a user interface of the website.

Application module 1142 can provide instructions for running a specialized application on client device 1130. In particular, the specialized application can be used to exchange data with server 1110 over the network 1160. Application module 1142 can include client-device-readable code for providing and implementing aspects of the present disclosure. For example, application module 1142 can provide instructions for implementing a mapping application or a virtual globe application.

The client device 1130 can include various user input devices 1150 for receiving information from a user, such as a touch screen, touch pad, data entry keys, speakers, mouse, motion sensor, and/or a microphone suitable for voice recognition. Further, the client device 1130 can have a display 1146 for presenting information, such as a rendering of a three-dimensional model in a three-dimensional environment.

The client device 1130 can also include a positioning system 1148 that can be used to identify the position of the client device 1130. The positioning system 1148 can be optionally used by the user to monitor the user's position relative to the rendering. The positioning system 1148 can be any device or circuitry for monitoring the position of the client device 1130. For example, the positioning device 1148 can determine actual or relative position by using a satellite navigation positioning system (e.g., a GPS system, a Galileo positioning system, the GLObal Navigation satellite system (GLONASS), the BeiDou Satellite Navigation and Positioning system), an inertial navigation system, a dead reckoning system, based on IP address, by using triangulation and/or proximity to cellular towers or WiFi hotspots, and/or other suitable techniques for determining position.

The client device 1130 can further include a graphics processing unit 1152. Graphics processing unit 1152 can be used by processor 1132 to render or depict three-dimensional imagery. In some embodiments, client device 1130 performs any and all three-dimensional rendering required for providing the three-dimensional environment.

The client device 1130 can include a network interface 1154 for communicating with server 1110 over network 1160. Network interface 1154 can include any components or configuration suitable for communication with server 1110 over network 1160, including, for example, one or more ports, transmitters, wireless cards, controllers, physical layer components, or other items for communication according to any currently known or future developed communications protocol or technology.

The network 1160 can be any type of communications network, such as a local area network (e.g., intranet), wide area network (e.g., Internet), or some combination thereof. The network 1160 can also include a direct connection between a client device 1130 and the server 1110. In general, communication between the server 1110 and a client device 1130 can be carried via network interface using any type of wired and/or wireless connection, using a variety of communication protocols (e.g., TCP/IP, HTTP), encodings or formats (e.g., HTML, XML), and/or protection schemes (e.g., VPN, secure HTTP, SSL).

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, may readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for transitioning between viewpoints in a three-dimensional environment, the method comprising:
    obtaining, by one or more computing devices, data indicative of an origin position and a destination position of a virtual camera in the three-dimensional environment, wherein a viewpoint of the virtual camera defines a portion of the three-dimensional environment displayed to a user, and wherein a visible distance is associated with the viewpoint of the camera, the visible distance correlated to a size of a visible area visible from the viewpoint;
    determining, by the one or more computing devices, a distance between the origin position and the destination position of the virtual camera;
    determining, by the one or more computing devices based at least in part on the distance between the origin position and the destination position of the virtual camera, a peak visible distance that is descriptive of a size of a peak visible area;
    identifying, by the one or more computing devices, a peak position at which the viewpoint of the virtual camera corresponds to the peak visible distance, the peak position including a peak altitude;
    determining, by the one or more computing devices, a parabolic camera trajectory that traverses the origin position, the peak position, and the destination position; and
    transitioning, by the one or more computing devices, the virtual camera from the origin position to the destination position along the parabolic camera trajectory.

2. The computer-implemented method of claim 1, wherein determining, by the one or more computing devices, the peak visible distance comprises inputting, by the one or more computing devices, the distance between the origin position and the destination position of the virtual camera into a scaling formula to obtain the peak visible distance.

3. The computer-implemented method of claim 2, wherein the scaling formula comprises the distance between the origin position and the destination position multiplied by a scaling factor.

4. The computer-implemented method of claim 3, wherein the scaling factor is greater than or equal to two-thirds and less than or equal to one.

5. The computer-implemented method of claim 3, wherein the scaling factor is inversely proportional to the distance between the origin position and the destination position of the virtual camera.

6. The computer-implemented method of claim 1, wherein the visible distance comprises a width of the visible area.

7. The computer-implemented method of claim 1, wherein transitioning, by the one or more computing devices, the virtual camera comprises transitioning, by the one or more computing devices, the virtual camera from the origin position to the destination position along the parabolic camera trajectory at a pan velocity that is logarithmically proportional to an altitude of the virtual camera.

8. The computer-implemented method of claim 1, wherein transitioning, by the one or more computing devices, the virtual camera comprises transitioning, by the one or more computing devices, the virtual camera from the origin position to the destination position along the parabolic camera trajectory at a zoom velocity that is logarithmically proportional to an altitude of the virtual camera.

9. The computer-implemented method of claim 1, wherein determining, by the one or more computing devices, the parabolic camera trajectory comprises determining, by the one or more computing devices, the parabolic camera trajectory that traverses the origin position, the peak position, and the destination position, and that is expressed in terms of a logarithm of an altitude of the virtual camera.

10. The computer-implemented method of claim 1, further comprising:
  determining, by the one or more computing devices, a flight duration for the parabolic camera trajectory based at least in part on the distance between the origin position and the destination position of the virtual camera and based at least in part on the peak altitude;
  wherein transitioning, by the one or more computing devices, the virtual camera from the origin position to the destination position along the parabolic camera trajectory comprises transitioning, by the one or more computing devices, the virtual camera from the origin position to the destination position along the parabolic camera trajectory for an amount of time equal to the flight duration.

11. The computer-implemented method of claim 1, wherein identifying, by the one or more computing devices, the peak position comprises:
  determining, by the one or more computing devices, whether a destination visible area associated with the destination position is included in the viewpoint of the virtual camera when the virtual camera is at the origin position;
  when the destination visible area associated with the destination position is included in the viewpoint of the virtual camera when the virtual camera is at the origin position, setting the peak position equal to the origin position; and
  when the destination visible area associated with the destination position is not included in the viewpoint of the virtual camera when the virtual camera is at the origin position, identifying, by the one or more computing devices, the peak position at which the viewpoint of the virtual camera corresponds to the peak visible distance.

12. The computer-implemented method of claim 1, wherein identifying, by the one or more computing devices, the peak position comprises:
  determining, by the one or more computing devices, whether an origin visible distance associated with the origin position is greater than or equal to the peak visible distance;
  when the origin visible distance associated with the origin position is greater than or equal to the peak visible distance, setting the peak position equal to the origin position; and
  when the origin visible distance associated with the origin position is not greater than or equal to the peak visible distance, identifying, by the one or more computing devices, the peak position at which the viewpoint of the virtual camera corresponds to the peak visible distance.

13. The computer-implemented method of claim 1, further comprising:
  obtaining, by the one or more computing devices, data indicative of an origin tilt angle at which the virtual camera is tilted at the origin position and a destination tilt angle at which the virtual camera will be tilted at the destination position;
  determining, by the one or more computing devices, a trough tilt angle for the peak position, wherein when the virtual camera is at the peak position and in the trough tilt angle, the viewpoint of the virtual camera would include both an origin visible area associated with the origin position and a destination visible area associated with the destination position if the peak visible distance were equal to the distance between the origin position and the destination position; and
  determining, by the one or more computing devices, a parabolic tilt trajectory that traverses the origin tilt angle, trough tilt angle, and destination tilt angle;
  wherein transitioning, by the one or more computing devices, the virtual camera from the origin position to the destination position along the parabolic camera trajectory comprises transitioning, by the one or more computing devices, the virtual camera from the origin position to the destination position along the parabolic camera trajectory and along the parabolic tilt trajectory.

14. The computer-implemented method of claim 13, further comprising:
  alternatingly adjusting, by the one or more computing devices for a plurality of iterations, the peak position and the trough tilt angle to obtain the parabolic camera trajectory and the parabolic tilt trajectory.

15. A computer system to transition between viewpoints in a three-dimensional environment, the system comprising:
  at least one processor; and
  at least one non-transitory computer-readable medium storing instructions that, when executed by the at least one processor cause the computer system to:
    obtain data indicative of an origin position and a destination position of a virtual camera in the three-dimensional environment, wherein a viewpoint of the virtual camera defines a portion of the three-dimensional environment displayed to a user;
    determine a distance between the origin position and the destination position of the virtual camera;
    determine, based at least in part on the distance between the origin position and the destination position of the virtual camera, a peak visible distance that is descriptive of a size of a peak visible area;

identify a peak position at which the viewpoint of the virtual camera corresponds to the peak visible distance, the peak position including a peak altitude;

identify a parabolic camera trajectory that traverses the origin position the peak position, and the destination position, wherein the parabolic camera trajectory includes a camera ascent portion and a camera descent portion; and transition the virtual camera from the origin position to the destination position along the parabolic camera trajectory.

16. The computer system of claim 15, wherein the instructions that cause the computer system to determine the peak visible distance based at least in part on the distance between the origin position and the destination position of the virtual camera cause the computer system to:

input the distance between the origin position and the destination position of the virtual camera into a scaling formula to obtain the peak visible distance, wherein the scaling formula comprises the distance between the origin position and the destination position multiplied by a scaling factor.

17. The computer system of claim 15, wherein the instructions that cause the computer system to transition the virtual camera cause the computer system to:

maintain the origin position in the viewpoint of the virtual camera for at least a majority of a camera ascent portion of the parabolic camera trajectory; and maintain the destination position in the viewpoint of the virtual camera for at least a majority of a camera descent portion of the parabolic camera trajectory.

18. A computer system, comprising:
a user computing device; and
a geographic information system server;
wherein at least one of the user computing device and the geographic information server comprise a non-transitory computer-readable medium storing instructions that, when executed by one or more processors cause the at least one of the user computing device and the geographic information server to:

obtain data indicative of an origin position and a destination position of a virtual camera in the three-dimensional environment, wherein a viewpoint of the virtual camera defines a portion of the three-dimensional environment displayed to a user, and wherein a visible distance is associated with the viewpoint of the camera, the visible distance correlated to a size of a visible area visible from the viewpoint;

determine a distance between the origin position and the destination position of the virtual camera;

determine, based at least in part on the distance between the origin position and the destination position of the virtual camera, a peak visible distance that is descriptive of a size of a peak visible area;

identify a peak position at which the viewpoint of the virtual camera corresponds to the peak visible distance, the peak position including a peak altitude;

identify a parabolic camera trajectory that traverses the origin position, the peak position, and the destination position; and transition the virtual camera from the origin position to the destination position along the parabolic camera trajectory.

19. The computer system of claim 18, wherein the instructions further cause the at least one of the user computing device and the geographic information server to:

identify a parabolic tilt trajectory that describes a tilt angle of the virtual camera during the parabolic camera trajectory, wherein the tilt angle of the virtual camera decrease during the camera ascent portion and increases during the camera descent portion.

20. The computer system of claim 18, wherein:
the parabolic camera trajectory includes a camera ascent portion and a camera descent portion;
the origin position is included in the viewpoint of the virtual camera for at least a majority of the camera ascent portion of the parabolic camera trajectory; and
the destination position is included in the viewpoint of the virtual camera for at least a majority of the camera descent portion of the parabolic camera trajectory.

* * * * *